March 21, 1950
M. BLAU
2,501,560
APPARATUS FOR INDICATING AND
MEASURING SMALL MOVEMENTS
Filed April 26, 1947
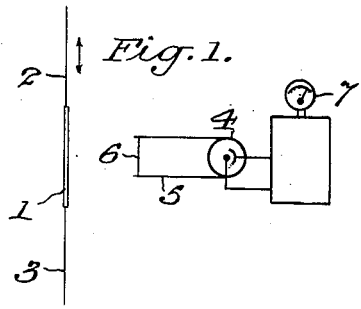
Fig.1.
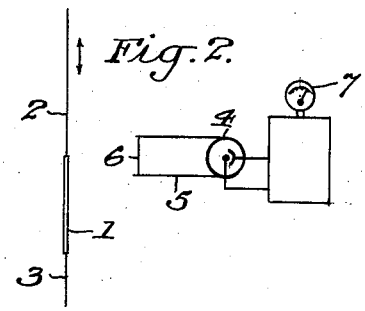
Fig.2.
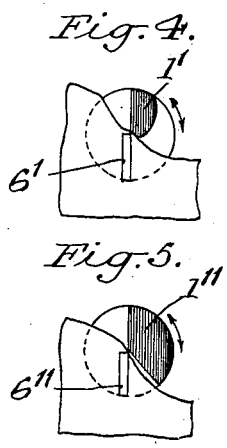
Fig.4.
Fig.5.
Fig.3.
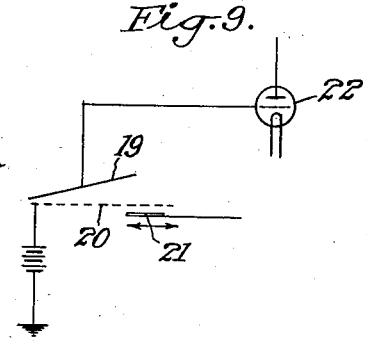
Fig.9.
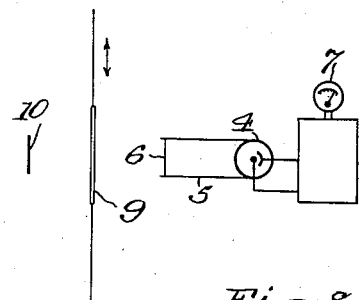
Fig.6.
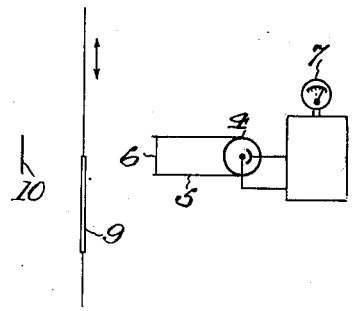
Fig.7.
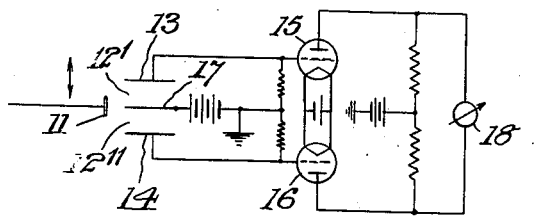
Fig.8.
Inventor:-
Marietta Blau
by Brown + Seward
Attorneys Patented Mar. 21, 1950

2,501,560

UNITED STATES PATENT OFFICE 2,501,560

APPARATUS FOR INDICATING AND MEASURING SMALL MOVEMENTS

Marietta Blau, New York, N. Y., assignor to Canadian Radium & Uranium Corporation, New York, N. Y., a corporation of New York Application April 26, 1947, Serial No. 744,234

1 Claim. (Cl. 250—71)

This invention relates to a method and apparatus for indicating and measuring small movements. The principle involved is comparable to the use of small mirrors which are rotated to vary the angularity of an incident beam of light, but in the present case a small screen of luminescent material is substituted for the mirror. Although the light intensity of such a screen is low, the constancy of the emitted light is high, so that its effect on a photoelectric cell or other light responsive element gives a very accurate result. Another advantage resides in the simplification of the device by eliminating the need for an outside source of light. A radiant source other than a luminous screen may also be used, as explained below.

Practical embodiments of the apparatus are shown diagrammatically in the accompanying drawings in which:

Figs. 1 and 2 represent side elevations of a self-activated luminous screen and a photoelectric cell, in different relative positions, the screen being viewed edgewise;

Fig. 3 represents a face view of a modified form of screen;

Figs. 4 and 5 represent face views of rotating disc screens, parts of the shields covering the screens being broken away;

Figs. 6 and 7 represent side elevations of an externally activated luminous screen and a photo-electric cell, in different relative positions.

Fig. 8 represents diagrammatically a system in which the ionizing power of an alpha-ray source is utilized to measure and indicate the movement of said source, and Fig. 9 represents a modified system of the same character.

Referring to the drawings, a screen 1 bearing a luminescent phosphor activated by the addition of radioactive material (for instance, as disclosed in the copending application of Blau et al., Serial No. 638,466, now abandoned) is supported, as by wires or the like 2, 3, in front of a photo-electric cell 4. The cell may be shielded by a tube 5 having a window 6 in its end, if desired. In the position shown in Fig. 1 the light from the screen 1 acts on the photocell 4 with maximum intensity and a corresponding reading may be observed on a meter 7 or the like operated conventionally by the cell.

The screen is assumed to be supported from, on, or by a part (not shown) the movement of which is to be indicated and/or measured. When the screen (thus supported) is moved to the position shown in Fig. 2 it is only partially opposite the photocell, which then receives only part of the emitted light and the difference in received light intensity results in a different reading on the meter. By suitable calibration not only the fact but also the extent of movement of the screen from its position of maximum illumination of the photocell can readily be determined, if desired.

The difference in light intensity received by the photocell can be increased by the provision of a screen in which the luminosity is graduated, as represented by the horizontal shading lines on the screen 8 of Fig. 3. This screen, having a height of 2 cm., is painted in narrow strips, for instance one millimeter wide, the compound used for the bottom strip being a phosphor containing 200 micrograms of radium per gram of phosphor, the next strip containing 190 micrograms of radium, and so on to the top of the screen. In this manner the change in intensity of the light received by the photocell is increased and the device is made more sensitive.

The relative motion of the screen for the purpose described may be not only rectilinear as indicated in the drawings, but also arcuate, rotational, or otherwise, so long as it has the effect of varying (preferably in determinable degrees) the intensity of the light received by the photocell.

Figs. 4 and 5 show discs adapted for rotation and bearing a luminous screen 1' or 1", which is passed across the window slit 6' or 6" in a shield interposed between the disc and a photocell (not shown). These figures illustrate not only a rotary motion of the screen, but also the possibility of forming the screens in various shapes so that various functional relationships (logarithmic, quadratic, etc.) can be obtained.

As an alternative arrangement (shown in Figs. 6 and 7) the screen 9 may be made of a phosphor without radioactive activation, and an alpha ray source 10 (such as radium or polonium) may be placed behind the screen, that is, on the side opposite the photocell. When the screen is in the position shown in Fig. 6 its luminosity and the light received by the photocell will be at a maximum. When the screen moves to the position shown in Fig. 7, such motion not only reduces its ability to illuminate the photocell but also reduces the effect of the alpha radiation on the screen, so that the variation in intensity of the light received by the photocell is greatly amplified.

The devices described herein may be used for measuring change of length, torsion angles and movements caused by mechanical, electrical or heat effects. In connection with an electric tuning fork they may be used for changing light signals periodically or for advertising illumination, and when connected to vibrating membranes they can serve to convert sound into light effects. For didactic purposes such devices may be connected to stringed musical instruments, the photocell operating (through an amplifier) an oscillograph so that the movement of the strings may be directly visualized.

In cases where the penetrating radiation of radium is objectionable, luminous compound activated with polonium, or polonium foils should be used.

The current produced in the photocell can be carried to distant places after suitable amplification.

In order to overcome certain inconvenient properties of photoelectric measurements like fatigue of photocells or luminous compounds, more elaborate circuits with compensation or bridge circuits may be applied if quantitative measurements of greater accuracy are required.

Another solution, especially for measurements of high accuracy, is the use of an alpha ray emitting source which moves with respect to an ionization chamber into which the alpha rays are free to pass. Depending on the deflection of the moving part on which the foil is attached, a smaller or greater part of the ionization chamber is irradiated. An arrangement of this type is shown in Fig. 8 where the source 11 moves in front of a double ionization chamber 12', 12''; the top and bottom electrodes 13, 14 are connected with the grids of electronic tubes 15, 16 (electrometer tubes), and the common electrode 17 lies on D. C. voltage (about 120 volts). As the foil moves up or down from the neutral position shown the ionization of the parts 12', 12'' of the chamber becomes unequal and a corresponding potential difference is indicated by the galvanometer 18. This device can be adapted to any kind of measuring instrument, increasing the accuracy of reading. Moreover, it permits after suitable amplification, remote reading or the activation of relays.

In the modified arrangement of Fig. 9 the ionization chamber is formed between the electrode 19 and the perforated electrode 20; the electrodes being non-parallel so that a field of varying density results. A foil 21 of radioactive material, such as radium or polonium, is arranged to move parallel to the perforated electrode; as its ionizing effect reaches denser parts of the field the conductivity of the latter is rapidly increased, and the position of the foil at any instant can be determined from a suitably calibrated meter controlled by the tube 22.

The invention is not limited to alpha particle emitting radioactive sources, but beta particle emitting sources and artificial radioactive sources may be used. Alpha particles are preferred, however, because of their higher ionization power.

It will be understood that various changes may be made in the details of the apparatus and in the steps of the method without departing from the spirit and scope of the invention, and hence I do not intend to be limited to such details except as they may be expressly or by necessary implication included in the claim.

What I claim is:

An apparatus for indicating and measuring small movements comprising, a self-activated luminescent screen including a phosphor and progressively graduated proportions of a radioactive activator, a radiation-responsive element adjacent to the said screen and adapted to receive radiation from a limited area thereof, and means for moving the screen with respect to the element to bring areas of progressively varying total luminosity into radiating relation with said element, the response of the element being a function of the spatial relation of the screen and element.

MARIETTA BLAU.

REFERENCES CITED

The following references are of record in the file of this patent:

UNITED STATES PATENTS

| Number | Name | Date |
|---|---|---|
| 863,287 | Kunz | Aug. 13, 1907 |
| 1,467,132 | Bilstein | Sept. 4, 1923 |
| 1,718,626 | Bleecker | June 25, 1929 |
| 2,112,504 | Mirfield | Mar. 29, 1938 |
| 2,302,554 | Kingsbury | Nov. 17, 1942 |
| 2,315,819 | Schlesman | Apr. 6, 1943 |